United States Patent
El Mezeni et al.

(10) Patent No.: US 9,621,767 B1
(45) Date of Patent: Apr. 11, 2017

(54) SPATIALLY ADAPTIVE TONE MAPPING FOR DISPLAY OF HIGH DYNAMIC RANGE (HDR) IMAGES

(71) Applicant: INTEL CORPORATION, Santa Clara, CA (US)

(72) Inventors: Dragomir El Mezeni, Belgrade (RS); Nemanja Tonic, Belgrade (RS); Stojan Rakic, Belgrade (RS)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/950,638

(22) Filed: Nov. 24, 2015

(51) Int. Cl.
G06K 9/00 (2006.01)
H04N 1/64 (2006.01)
H04N 19/186 (2014.01)
H04N 19/187 (2014.01)

(52) U.S. Cl.
CPC ........... *H04N 1/648* (2013.01); *H04N 19/186* (2014.11); *H04N 19/187* (2014.11)

(58) Field of Classification Search
CPC .......... G06T 9/005; H04N 1/64; H04N 1/648; H04N 7/26148; H04N 7/26292; H04N 7/30; H04N 19/186; H04N 19/187
See application file for complete search history.

(56) References Cited

U.S. PATENT DOCUMENTS 5,455,874 A * 10/1995 Ormsby .................. H04N 1/64
375/240.01
7,031,549 B2 * 4/2006 Luo ......................... G06T 5/008
358/3.21
7,933,454 B2 * 4/2011 Bressan ............. G06K 9/00456
382/224

(Continued)

FOREIGN PATENT DOCUMENTS

KR 10-2013-0004708 3/2013

OTHER PUBLICATIONS

Schlick, Christopher, "Quantization Techniques for Visualization of High Dynamic Range Pictures", In Photorealistic Rendering Techniques, 1995, pp. 7-20.

(Continued)

*Primary Examiner* — Amir Alavi
(74) *Attorney, Agent, or Firm* — Finch & Maloney PLLC

(57) ABSTRACT

Techniques are provided for spatially adaptive tone mapping for display or reproduction of HDR images on devices with lower dynamic range capability. An example system may include a log-conversion circuit to convert luminance data, from a received image, to a logarithm domain. The system may also include an edge-aware filter circuit to decompose the log domain luminance data into a base layer, a small scale detail layer, and a large scale detail layer. The system may further include an amplitude adjustment circuit to shift and scale data amplitudes in each of the layers to a selected range and a linear-conversion circuit to convert the adjusted layers from the log domain back to the linear domain. The system may further include a tone compression circuit to generate compressed linear domain layers and a luminance data reconstruction circuit to generate compressed luminance data based on the compressed linear domain layers.

21 Claims, 8 Drawing Sheets

(3 of 8 Drawing Sheet(s) Filed in Color)

(56) References Cited

U.S. PATENT DOCUMENTS

| | | | |
|---|---|---|---|
| 8,330,768 B2* | 12/2012 | Mantiuk | H04N 1/6027 345/589 |
| 8,406,569 B2* | 3/2013 | Segall | G06T 5/50 382/254 |
| 8,737,474 B2* | 5/2014 | Gao | H04N 19/00315 375/240.01 |
| 8,798,149 B2* | 8/2014 | Wu | H04N 7/50 375/240.15 |
| 8,995,525 B2* | 3/2015 | Wiegand | H04N 19/593 375/240.02 |
| 9,105,078 B2 | 8/2015 | Lim | |
| 2009/0041376 A1* | 2/2009 | Carletta | G06T 5/50 382/274 |
| 2012/0113130 A1 | 5/2012 | Zhai | |
| 2013/0335438 A1 | 12/2013 | Ward | |
| 2014/0219333 A1* | 8/2014 | Xu | H04N 19/00066 375/240.02 |
| 2014/0341468 A1 | 11/2014 | Paris | |
| 2016/0286226 A1* | 9/2016 | Ridge | H04N 19/30 |

OTHER PUBLICATIONS

Larson, G. W., et al., "A Visibility Matching Tone Reproduction Operator for High Dynamic Range Scenes", Visualization and Computer Graphics, IEEE Transactions, 1997, vol. 3, pp. 291-306.

Pattanaik, S., et al., "A Multiscale Model of Adaptation and Spatial Vision for Realistic Image Display", In Proceedings of the 25th annual conference on Computer graphics and interactivet echniques, 1998, pp. 287-298.

Tumblin, Jack and Turk, Greg, "LCIS: A Boundary Hierarchy for Detail-Preserving Contrast Reduction", In Proceedings of the 26th annual conference on Computer graphics and interactive techniques, 1999, pp. 83-90.

Durand, Fredo and Dorsey, Julie, "Fast Bilateral Filtering for the Display of High-Dynamic-Range Images", ACM transactions on graphics (TOG), 2002, vol. 21, pp. 257-266.

Fattal, R., et al., "Gradient Domain High Dynamic Range Compression", In ACM Transactions on Graphics(TOG), 2002, vol. 21, pp. 249-256.

Reinhard, E., et al., "Photographic Tone Reproduction for Digital Images", In ACM Transactions on Graphics (TOG), 2002, vol. 21, pp. 267-276.

Johnson, G. M. and Fairchild, M. D., "Rendering HDR Images", In Color and Imaging Conference, 2002, vol. 2003, pp. 36-41.

Drago, F. et al., "Adaptive Logarithmic Mapping for Displaying High Contrast Scenes", Eurographics, 2003, vol. 22, 9 pages.

Li, Y. et al., "Compressing and Companding High Dynamic Range Images with Subband Architectures", ACM transactions on graphics (TOG), 2005, vol. 24, pp. 836-844.

Meylan, Laurence, "High Dynamic Range Image Rendering With a Retinex-Based Adaptive Filter", IEEE Transactions on Image Processing, Sep. 2006, vol. 15, pp. 2820-2830.

Kuang, J. et al., "iCAM06: A refined image appearance model for HDR image rendering", Journal of Visual Communication & Image Representation, 2007, vol. 18, pp. 406-414.

Mantiuk, R. et al., "Display Adaptive Tone Mapping", In ACM Transactions on Graphics (TOG), 2008, vol. 27, p. 68.

Shimoyama, S. et al., "Local Adaptive Tone Mapping with Composite Multiple Gamma Functions", In Image Processing (ICIP), 2009, 16th IEEE International Conference on, pp. 3153-3156.

He, K. et al., "Guided Image Filtering", In Computer Vision—ECCV, 2010, pp. 1-14.

Boschetti, A. et al., "High Dynamic Range Image Tone Mapping Based on Local Histogram Equalization", In Multimedia and Expo (ICME), 2010 IEEE International Conference on, pp. 1130-1135.

Paris, S. et al., "Local Laplacian Filters: Edge-aware Image Processing with a Laplacian Pyramid", ACM Trans. Graph., 2011, vol. 30.4.

Ahn, H. et al., "Adaptive Local Tone Mapping Based on Retinex for High Dynamic Range Images", Consumer Electronics (ICCE), 2013 IEEE International Conference on, pp. 153-156.

Tan, L. et al., "A Retinex-Based Local Tone Mapping Algorithm Using L0 Smoothing Filter", Advances in Image and GraphicsTechnologies, Springer Berlin Heidelberg, 2014, pp. 40-47.

Lee, B. J. and Song, B. C., "Local Tone Mapping using Sub-band Decomposed Multi-scale Retinex for High Dynamic Range Images", Consumer Electronics (ICCE), 2014 IEEE International Conference on, pp. 125-128.

Zhang, E. et al., "A Novel Tone Mapping Method for High Dynamic Range Image by Incorporating Edge-Preserving Filter Into Method Based on Retinex", Applied Mathematics & Information Sciences, An International Journal, 2015, vol. 9, pp. 411-417.

International Search Report and Written Opinion for International PCT Application No. PCT/US2016/051006, dated Dec. 23, 2016, 11 pages.

* cited by examiner

700

```
┌─────────────────────────────────────────────────────────────┐
│ Extract luminance data associated with pixels from a        │
│ received image.                                             │
│ 710                                                         │
└─────────────────────────────────────────────────────────────┘
                              ↓
┌─────────────────────────────────────────────────────────────┐
│ Convert the luminance data to a logarithm domain.           │
│ 720                                                         │
└─────────────────────────────────────────────────────────────┘
                              ↓
┌─────────────────────────────────────────────────────────────┐
│ Decompose the logarithm domain luminance data into a base   │
│ layer, a small scale detail layer and a large scale detail  │
│ layer.                                                      │
│ 730                                                         │
└─────────────────────────────────────────────────────────────┘
                              ↓
┌─────────────────────────────────────────────────────────────┐
│ Adjust amplitudes of data in each of the layers to shift    │
│ and scale the amplitude data into a selected range.         │
│ 740                                                         │
└─────────────────────────────────────────────────────────────┘
                              ↓
┌─────────────────────────────────────────────────────────────┐
│ Convert the adjusted layers from the log domain to a linear │
│ domain.                                                     │
│ 750                                                         │
└─────────────────────────────────────────────────────────────┘
                              ↓
┌─────────────────────────────────────────────────────────────┐
│ Apply a global tone compression function to the converted   │
│ linear domain base layer to generate compressed linear      │
│ domain layers.                                              │
│ 760                                                         │
└─────────────────────────────────────────────────────────────┘
                              ↓
┌─────────────────────────────────────────────────────────────┐
│ Generate compressed luminance data based on a multiplicative│
│ product of the compressed linear domain layers.             │
│ 770                                                         │
└─────────────────────────────────────────────────────────────┘
```

FIG. 7

SPATIALLY ADAPTIVE TONE MAPPING FOR DISPLAY OF HIGH DYNAMIC RANGE (HDR) IMAGES

BACKGROUND

Cameras, and other imaging devices, with the capability to provide increasingly high dynamic range images, are becoming more widely available. Such HDR images are able to capture a wider range of luminosity or brightness than is possible with more traditional imaging devices and techniques. This can be useful when the subject matter of the photograph contains both extremely bright and extremely dark regions, such as, for example, a mixture of sunlit areas and shadowed areas. HDR imaging is sometimes accomplished by capturing multiple images of the same scene, each taken at narrow but varying exposure levels, and combining them into a composite image. HDR images may also be obtained with sensors that have greater dynamic range, and which can generate pixel values with an increased number of bits to represent that entire range, without losing detail through truncation of least significant bits.

Currently, however, most conventional display devices have much more limited dynamic range (e.g., low dynamic range or LDR), and are unable to reproduce such HDR images in a visually acceptable format. Attempts to display an HDR image on a standard or conventional LDR display typically result in regions of the image that are either washed out or blacked out, or both, with a resulting loss of image detail. Existing solutions to this problem attempt to reduce image contrast through either global or local tone (e.g., luminosity and/or color) mapping operations. Global operators apply the same mapping function to each image pixel and provide global contrast reduction, but typically suffer from loss of detail in the dark and bright areas of the image. Local operators, on the other hand, are better at preserving local image features such as details in bright and dark areas, but generally suffer from low global contrast and may introduce image artifacts such as halo effects. Additionally, local tone mapping operators are more computationally intensive and are generally not suitable for real-time applications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts, and in which:

FIG. 7 is a flowchart illustrating a methodology for spatially adaptive tone mapping, in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for spatially adaptive tone mapping for display or reproduction of high dynamic range (HDR) images on devices with lower dynamic range capability. The techniques, which include processing a given input HDR image through a pre-processing operation and a subsequent dynamic range compression operation, enable the preservation of image details, particularly in bright and dark regions of the image. The pre-processing operation is performed in the logarithmic domain and the subsequent dynamic range compression operation is performed in the linear domain. In the pre-processing operation, luminance data from the input HDR image is decomposed into a number of layers or planes (a base layer, a small scale detail layer, and a large scale detail layer) of varying detail using a guided edge-aware filter that provides for relatively more efficient execution. The small scale detail layer, and the large scale detail layer allow for improved control over image sharpness and local contrast of the output image. The base layer is partially compressed, and the details layers are enhanced using a spatially varying gain map configured to provide contrast boost in dark image areas. After conversion back to the linear domain, the base layer is further compressed using a log based tone compression function configured to dynamically adapt to statistics of the base layer to achieve improved contrast enhancement, and to preserve the details in both highlights and shadows by limiting the range of the compressed base layer. The compressed layers are recombined through multiplication to generate compressed luminance data. An output image, with enhanced details suitable for display on a lower dynamic range (LDR) device, may then be generated from the compressed luminance data in combination with red-green-blue (RGB) data from the original HDR image using color adaptation techniques.

The techniques described herein provide for generally increased computational efficiency compared to existing local tone mapping methods and may therefore be suitable for use in real-time image processing implementations including the both still imaging and video applications. The techniques can be implemented in hardware or software or a combination thereof.

Figure 1:
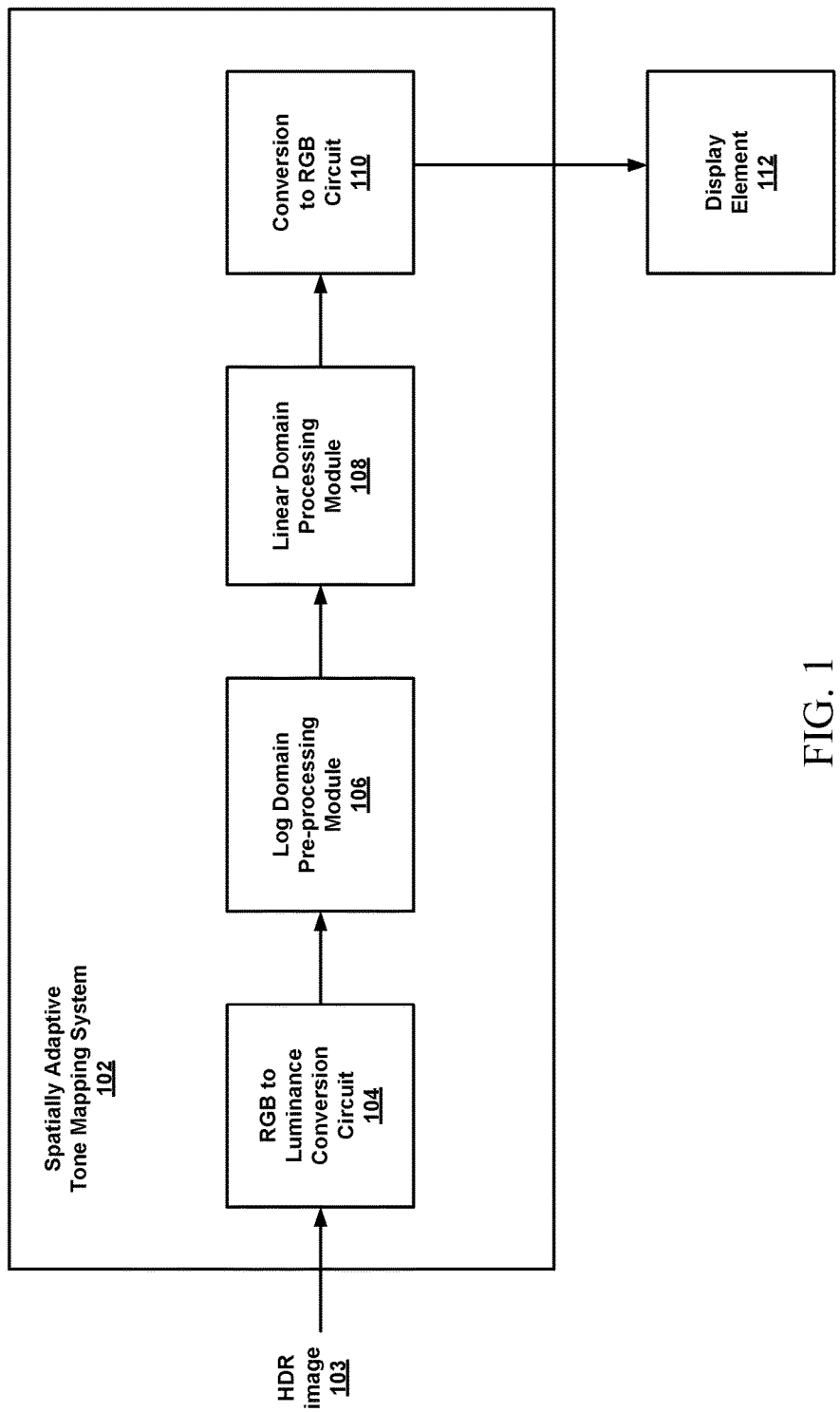
FIG. 1 is a top level system diagram of a spatially adaptive tone mapping system, configured in accordance with certain of the embodiments disclosed herein.

FIG. 1 is a top level system diagram of a spatially adaptive tone mapping system, configured in accordance with certain of the embodiments disclosed herein. The system 102 is shown to include an RGB to luminance conversion circuit 104, a log domain pre-processing module 106, a linear domain processing module 108 and a conversion to RGB circuit 110. The system 102 may be configured to perform spatially adaptive tone mapping on a received HDR image 103 and generate a processed image suitable for display on a lower dynamic range display element 112 or other type of image reproduction device.

The RGB to luminance conversion circuit 104 may be configured to process the input or received HDR image 103, presented in a typical RGB format, to extract input luminance data $Y_{IN}$ for compression. Typically only the luminance data is compressed since it provides achromatic information that describes or represents the lighting levels of the image. The input RGB values for each image pixel are represented by a given number of bits for each color channel (RGB). HDR image RGB values generally comprise a greater numbers of bits than LDR images. The RGB channels may be normalized to a range of 0 to 1, where 1 represents a maximum pixel value associated with associated with a maximum allowable absolute light level. Luminance may then be calculated, for example, using an ITU-R BT.709 standard transform (or other suitable method):

$$Y_{IN}=0.2126 \cdot R+0.7152 \cdot G+0.0722 \cdot B$$

In some embodiments, the HDR image 103 may be provided in a luminance/chrominance format, in which case the luminance channel will be readily available. Of course, image data may also be provided in other formats and other appropriate conversion techniques may be used in those cases.

The log domain pre-processing module 106 may be configured to perform a pre-processing operation in the logarithm domain where the luminance data is decomposed into a number of layers or planes of varying detail (e.g., base layers, small scale detail layer and large scale detail layer) using a guided edge-aware filter. The base layer is partially compressed, and the details layers are enhanced using a spatially varying gain map configured to provide contrast boost in dark image areas. The log domain pre-processing module 106 will be described in greater detail in connection with FIG. 3.

The linear domain processing module 108 may be configured to provide further compression, after conversion back to the linear domain, using a log based tone compression function configured to dynamically adapt to statistics of the base layer. The linear domain processing module 108 may then reconstruct compressed luminance data from the base and detail layers. The linear domain processing module 108 will be described in greater detail in connection with FIG. 4. The conversion to RGB circuit 110 may be configured to convert the compressed luminance data back to an RGB image, as will also be described below. The converted RGB image will be suitable for display on a conventional or LDR type display element 112.

Figure 2:
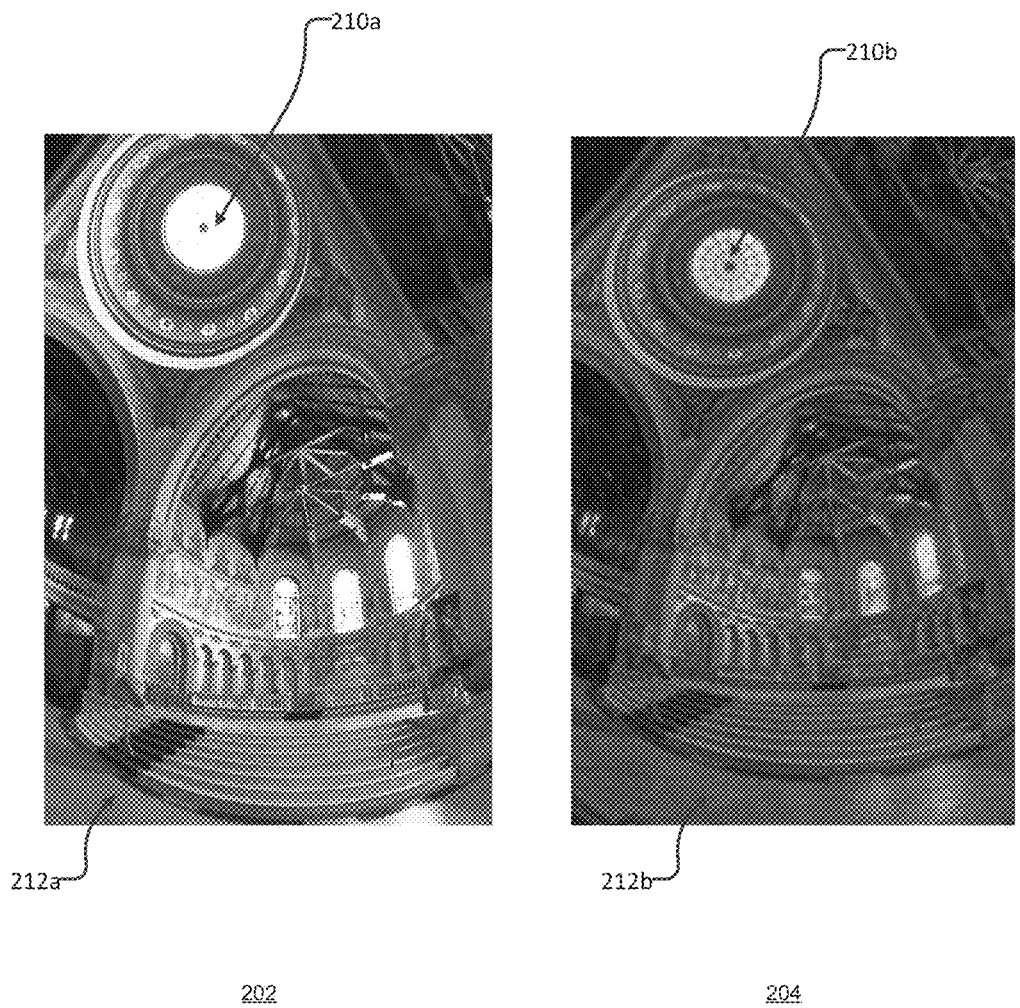
FIG. 2 illustrates image frames associated with processing by the spatially adaptive tone mapping system, configured in accordance with certain of the embodiments disclosed herein.

FIG. 2 illustrates image frames associated with processing by the spatially adaptive tone mapping system, configured in accordance with certain of the embodiments disclosed herein. Image 202 illustrates an attempt to display an HDR image on a standard display or reproduction device without the benefit of tone mapping. As can be seen, image details are lost in areas of relatively extreme brightness, such as the windows 210a. Indeed, areas of only moderate brightness, such as the floor 212a suppress much of the detail in the tile flooring. In contrast, image 204 illustrates the results of processing based on the spatially adaptive tone mapping techniques described herein. An improvement can be seen in the detail visible in the window areas 210b and flooring 212b as well as in other areas.

Figure 3:
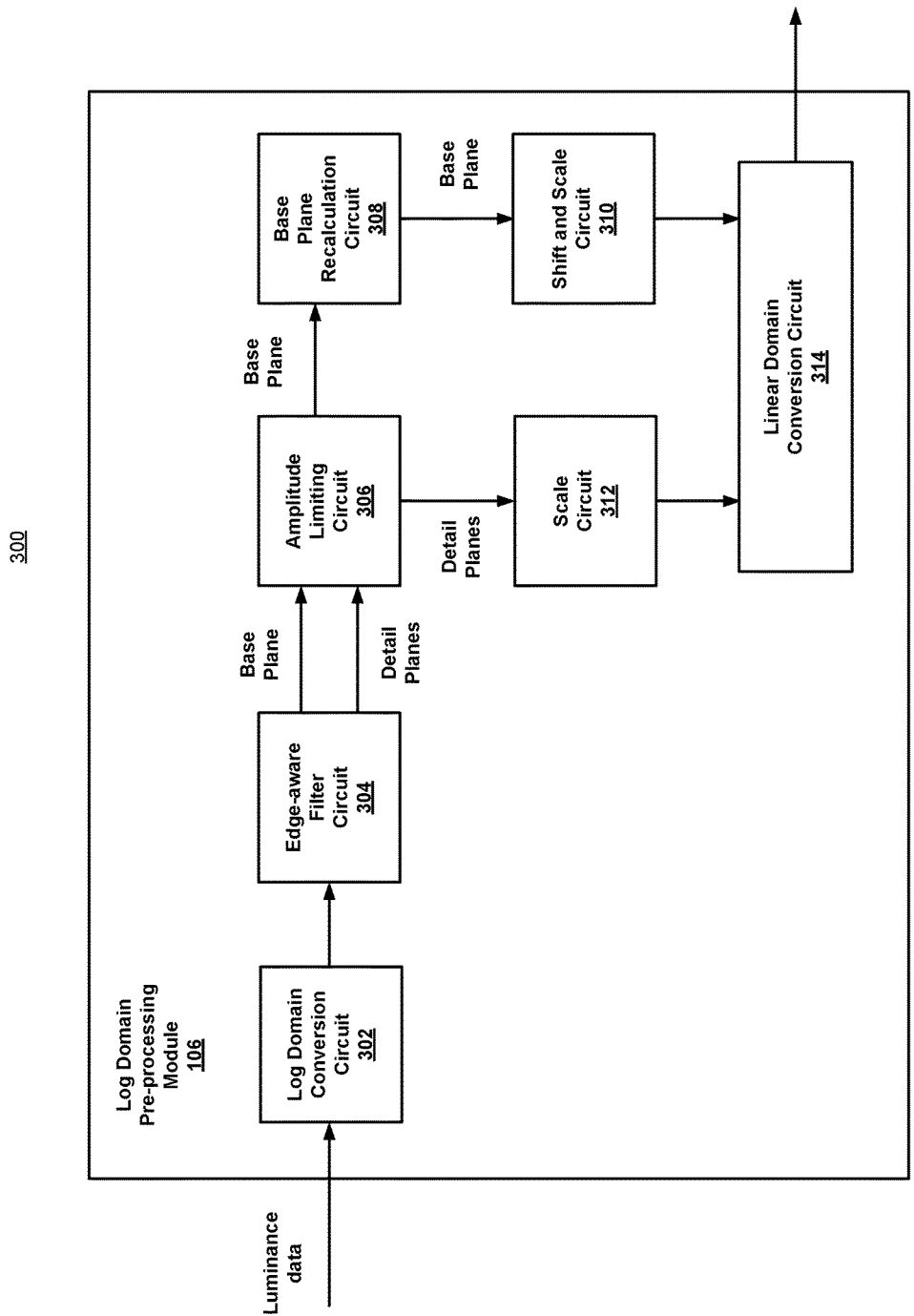
FIG. 3 is a more detailed block diagram of the log domain pre-processing module of the spatially adaptive tone mapping system, configured in accordance with certain of the embodiments disclosed herein.

FIG. 3 is a more detailed block diagram of the log domain pre-processing module of the spatially adaptive tone mapping system, configured in accordance with certain of the embodiments disclosed herein. The log domain pre-processing module 106 is shown to include a log domain conversion circuit 302, an edge-aware filter circuit 304, an amplitude limiting circuit 306, a base plane recalculation circuit 308, a scaling circuit 312, a shifting and scaling circuit 310 and a linear domain conversion circuit 314.

Log domain conversion circuit 302 may be configured to convert the input luminance data $Y_{IN}$, from a linear domain to a logarithm domain, for example according to the equation:

$$F_{LOG}=\log_2(Y_{IN}+\epsilon)$$

In a preferred embodiment, the logarithm operation is a base 2 log, although other log base values are possible. A small value, epsilon, may be added to the luminance data prior to performing the log operation to ensure that the argument to the logarithm is not equal to zero which is a mathematically undefined operation. The value of epsilon may be chosen to be small enough to have a negligible (e.g., visually imperceptible) effect on the results of the processing techniques described herein.

Edge-aware filter circuit 304 may be configured to decompose the logarithm domain luminance data ($Y_{LOG}$) into a base layer ($B_{LOG}$), a small scale detail layer ($Ds_{LOG}$) and a large scale detail layer ($Dl_{LOG}$). In some embodiments, the edge-aware filter circuit is implemented as an edge-aware guided filter using known techniques in light of the present disclosure. The edge-aware guided filter may accept filter radius parameters, R, each of which is uniquely selected to generate the base layer, the small scale detail layer and the large scale detail layer. The length of the filter, L, is generally related to the selected radius R, for example L=2R+1. In some embodiments, small scale details may be associated with an image radius R in the range of 4 to 5 pixels; and large scale details associated with an image radius R in the range of 30 to 35, although other values are possible. In some embodiments, the filter length L for the large scale detail image region is typically selected to be approximately 6% of the smaller dimension of the input image (either width or height). It will be appreciated that the base layer is essentially a low-pass filtered (or blurred) version of the luminance data while the detailed layers are relatively more high-pass filtered versions.

The use of an edge-aware guided filter in the decomposition process may provide the best tradeoff between image quality and processing complexity. It generally provides better detail decomposition and is less prone to gradient reversals artifacts than bilateral filters and it is typically faster than other edge-aware approaches. It can be calculated relatively efficiently since it employs only 4 mean filtering (smoothing) functions which can be implemented in a processing time proportional to the image size (total number of pixels) and is independent of the filter size.

The small scale detail layer or plane ($Ds_{LOG}$) is obtained using the filter with a relatively small radius parameter, for example on the order of 4 to 5 pixels. Small details are associated with smaller scale or "micro" contrast and provide the sensation of image sharpness. The large scale detail layer or plane ($Dl_{LOG}$) is obtained using the filter with a relatively large radius parameter, for example on the order of 30 to 35 pixels. Large details provide information about larger features and illumination changes and they are generally responsible for local contrast. This separation into multiple layers provides additional control over detail enhancement. For example, local contrast can be increased by amplification of large details while avoiding over-sharpening by applying smaller gain to small details.

Amplitude limiting circuit 306 may be configured to limit the amplitudes of the detail layers ($Ds_{LOG}$, $Dl_{LOG}$) to predefined values, dsLimit for small details and dlLimit for large details. The value of this limit restricts the level of detail which is allowed to be passed from input to the detail layers. The motivation for detail limitations is to enable control over sudden transitions which can be caused by impulse noise, dead pixels, specular areas or gradient reversals. Amplitude limiting may be bypassed during implementation by setting the detail limit values to zero.

Base plane recalculation circuit 308 may be configured to recalculate the base layer after the detail limitations are imposed by amplitude limiting circuit 306 to avoid any loss of information. The operations of the edge-aware filter circuit 304, amplitude limiting circuit 306 and base plane recalculation circuit 308, as described above, may be summarized by the following equations:

$$Bs_{LOG} = \text{guidedFilter}(Y_{LOG}, \text{radius}_{small}, \text{eps}_{small})$$

$$Ds_{LOG} = Y_{LOG} - Bs_{LOG}$$

$$Ds_{LOG} = \text{clip}(Ds_{LOG}, ds\text{Limit})$$

$$Bs_{LOG} = Y_{LOG} - Ds_{LOG}$$

$$B_{LOG} = \text{guidedFilter}(Bs_{LOG}, \text{radius}_{large}, \text{eps}_{large})$$

$$Dl_{LOG} = B_{LOG} - Bs_{LOG}$$

$$Dl_{LOG} = \text{clip}(Dl_{LOG}, dl_{Limit})$$

$$B_{LOG} = Bs_{LOG} - Dl_{LOG}$$

In the above equations, "guided filter" refers to the edge-aware filter circuit 304, "clip" refers to the amplitude limiting circuit 306 and the eps parameter is used to select a desired level of filter blurring (e.g., the filter cutoff frequency).

Scaling circuit 312 may be configured to adjust the amplitudes of the data in the detail layers, and shifting and scaling circuit 310 may be configured to adjust the amplitudes of the data in the base layers, such that they are mapped into a selected range of values, to achieve an initial log domain tone compression or contrast reduction. Contrast reduction performed in the logarithm domain is used to limit widely varying dynamic ranges of input images into a predefined range, as opposed to tone compression performed in the linear domain which may be used to adjust final appearance of the tone mapped image.

In some images, poor exposure settings and/or problematic transitions from absolute to relative luminance may result in a maximum relative luminance value that is less than unity in the linear domain (or equivalently, smaller than zero in the logarithm domain). This can result in inefficient usage of output pixel values, that is to say, not taking advantage of the entire range of available values. Shifting and scaling circuit 310 may be configured to remap the base layer values to compensate for exposure errors and to place the largest log luminance value at zero. Scaling may thus ensure that a histogram of the log luminance data fits into a predefined contrast ratio. The following equation illustrates the calculation of the remapped log domain base layer, $\hat{B}_{LOG}$, where offset is the shift value and ratio is the scale factor.

$$\text{offset} = -\max(B_{LOG})$$

$$\text{ratio} = \frac{\text{targetRange}}{\max(B_{LOG}) - \min(B_{LOG})}$$

$$\hat{B}_{LOG} = \text{ratio} \cdot (B_{LOG} + \text{offset})$$

In some embodiments, targetRange, may be set to a value of approximately 5, generally corresponding to an exposure value (e.g., a photographic stop) of 5.

Scale circuit 312 may be configured to enhance the detail layers in the logarithm domain by multiplying each of the detail planes with a gain factor providing spatially uniform detail processing. Since noise is addressed in the later stages of the image processing pipeline, additional detail boosting in dark areas may be added in this process. In some embodiments, additional spatially varying detail enhancement may be applied but may be limited to a factor of 2 since larger values can over exaggerate details. The limited range of the base layer, after log domain range compression, simplifies the creation of a variable gain map. For example, log domain range compression fits the base plane values into a range of [−5, 0] with the darkest pixels occupying the lower part of this range. If this base map is divided by −2.5 it provides a variable detail gain map where the largest gain is 2 in the darkest areas, ranging down to zero for larger luminance values. Detail suppression in bright areas may be avoided by clipping gain correction to a minimum value of 1.

Linear domain conversion circuit 314 may be configured to convert the modified base and detail layers back to the linear domain by applying a base 2 exponentiation function, for example:

$$B = 2^{\hat{B}_{LOG}}$$

$$D = 2^{(\hat{D}l_{LOG} + \hat{D}s_{LOG})}$$

Figure 4:
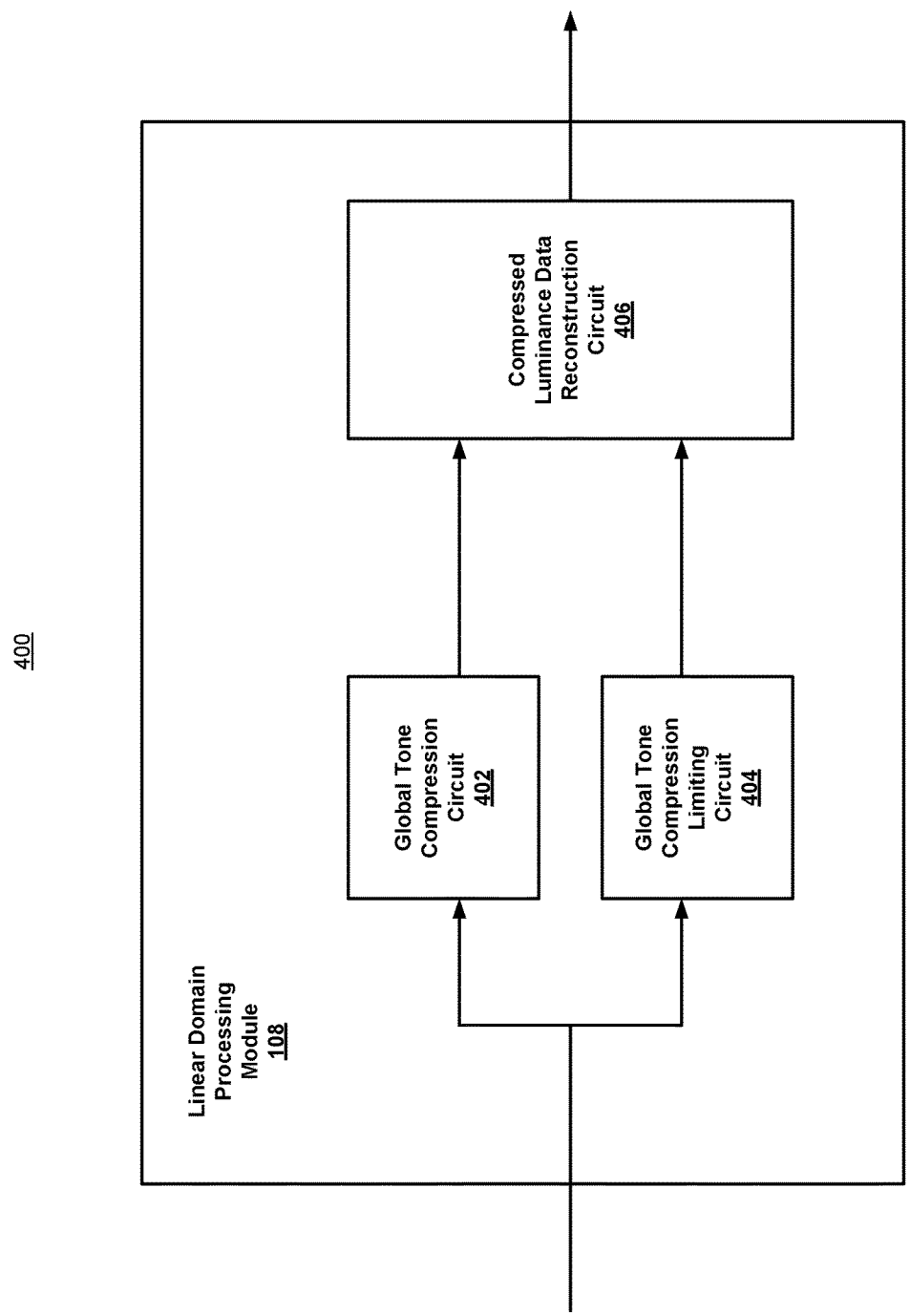
FIG. 4 is a more detailed block diagram of the linear domain processing module of the spatially adaptive tone mapping system, configured in accordance with certain of the embodiments disclosed herein.

FIG. 4 is a more detailed block diagram of the linear domain processing module of the spatially adaptive tone mapping system, configured in accordance with certain of the embodiments disclosed herein. The linear domain processing module 108 is shown to include a global tone compression circuit 402, a global tone compression limiting circuit 404 and a compressed luminance data reconstruction circuit 406.

Figure 5:
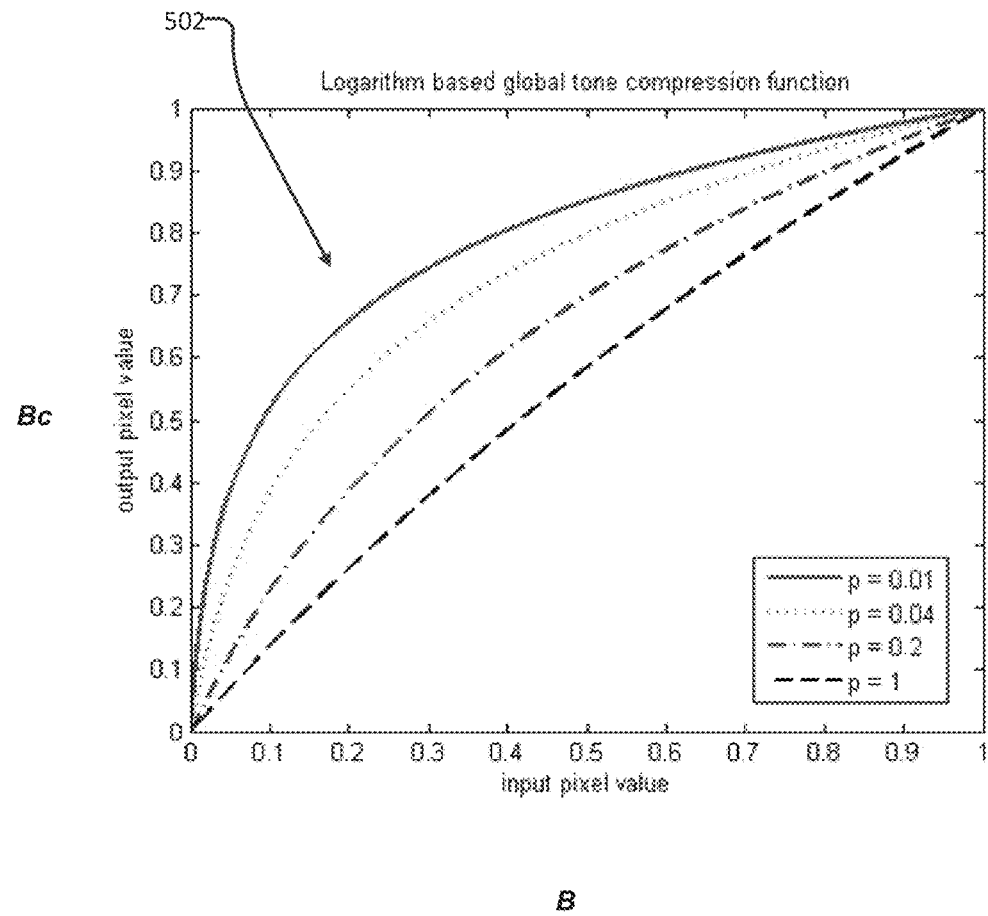
FIG. 5 illustrates a plot of one example tone compression function associated with processing by the spatially adaptive tone mapping system, configured in accordance with certain of the embodiments disclosed herein.

Global tone compression circuit 402 may be configured to apply further tone compression in the linear domain. After log domain processing, a histogram of the base layer in the linear domain may still have a relatively large peak associated with the lowest pixel values implying low contrast in shadow areas. Processing in the logarithm domain has placed the base layer histogram into a predefined range causing subsequent operations to be less sensitive to the dynamic range of the input image. An improvement in the displayable contrast can be achieved by applying any of the known global tone compression techniques, in light of the present disclosure. Some examples of known global tone compression functions include gamma, logarithmic and rational function tone compression. Since logarithmic tone compression complies with Weber-Fechner's law of just noticeable differences, the compressed base plane $B_C$ can be calculated using the following equation for logarithmic compression:

$$B_C = \frac{\log(B+p) - \log(p)}{\log(1+p) - \log(p)}$$

where p is a parameter that controls the strength of the compression. FIG. 5 illustrates a family of tone compression curves for different values of p={0.01, 0.04, 0.2, 1}. In some embodiments, the parameter p may be adjusted by a user or operator of the system to fine tune the output image.

Figure 6:
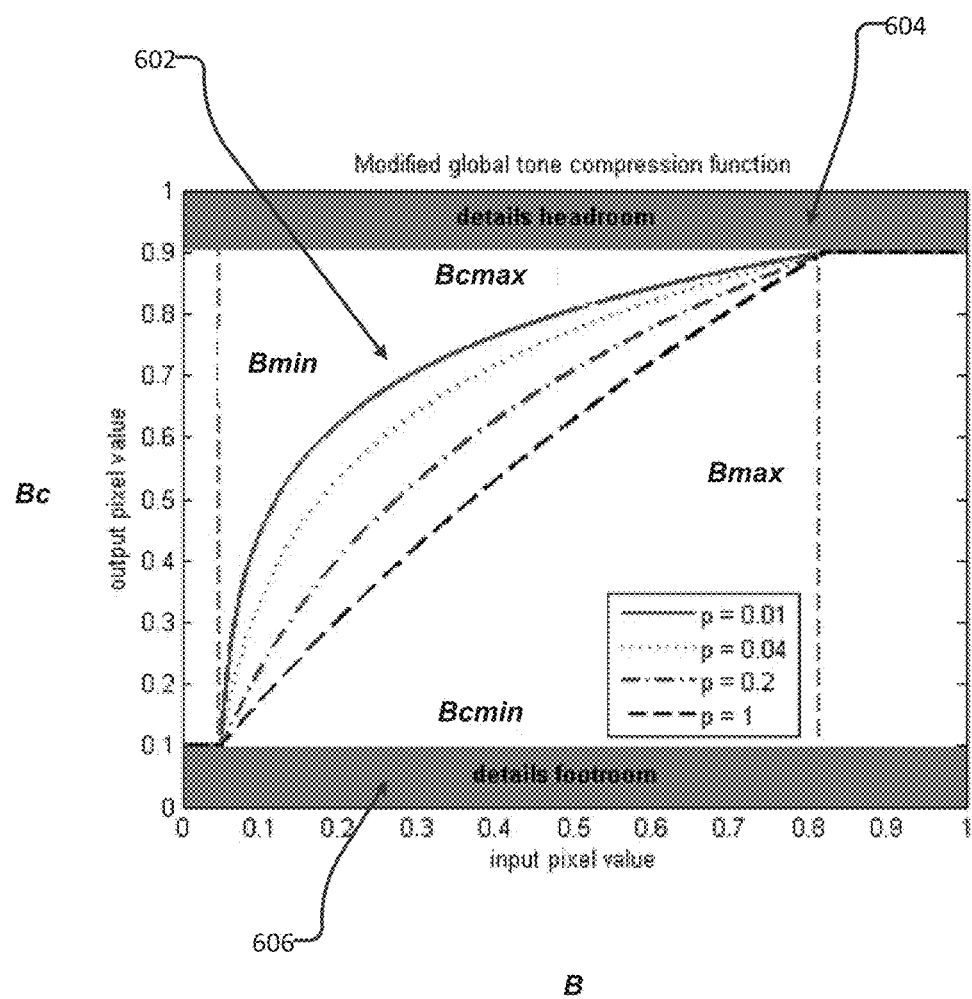
FIG. 6 illustrates a plot of another example tone compression function associated with processing by the spatially adaptive tone mapping system, configured in accordance with certain of the embodiments disclosed herein.

Straightforward application of tone compression after log domain processing, however, can reduce global contrast and cause a foggy appearance in the output image. Histogram stretching after tone compression can restore global contrast but generally cannot improve local contrast since a large peak will still be present for low pixel values. In order to take full advantage of the tone compression curve for contrast enhancement in dark image areas, the tone compression function may be adjusted to the base plane statistics (e.g., $B_{min}$ and $B_{max}$). Additionally, it is not desirable to have the compressed base plane consume the entire output range since clipping of details near each end of the range will occur. This can be avoided by limiting the output range of the tone compression function, leaving enough headroom and footroom for details in dark and bright areas of the image to reduce clipping. Global tone compression limiting circuit 404 may be configured to accomplish this, for example as an alternative to circuit 402, through use of a family of modified tone compression functions as illustrated in FIG. 6. The compressed base plane $B_C$ can be calculated using the following equation for logarithmic compression with output limiting:

$$B_C = (B_{Cmax} - B_{Cmin}) \frac{\log\left(\frac{B - B_{min}}{B_{max} - B_{min}} + p\right) - \log(p)}{\log(1+p) - \log(p)} + B_{Cmin}$$

where p again is a parameter that controls the strength of the compression. In some embodiments, the parameter p as well as the output range ($B_{Cmin}$ and $B_{Cmax}$) may be adjusted by a user or operator of the system to fine tune the output image.

Compressed luminance data reconstruction circuit 406 may be configured to combine the compressed base layer and details layer to a compressed luminance layer $Y_C$ through multiplication:

$$Y_C = B_C \cdot D$$

The conversion to RGB circuit 110 may be configured to convert the compressed luminance layer $Y_C$ back to an RGB image suitable for display on a conventional or LDR type display element 112. The resulting tone mapped output image ($R_{OUT}$, $G_{OUT}$, $B_{OUT}$) may be generated from the input linear RGB values ($R_{IN}$, $G_{IN}$, $B_{IN}$), the input luminance values $Y_{IN}$ and the output compressed luminance, using known techniques in light of the present disclosure. For example a variation of Schlick's method with variable saturation parameter s and gamma correction factor γ may be used as follows:

$$R_{OUT} = Y_C \left(\frac{R_{IN}}{Y_{IN}}\right)^{\frac{s}{\gamma}}$$

$$G_{OUT} = Y_C \left(\frac{G_{IN}}{Y_{IN}}\right)^{\frac{s}{\gamma}}$$

$$B_{OUT} = Y_C \left(\frac{B_{IN}}{Y_{IN}}\right)^{\frac{s}{\gamma}}$$

The parameter γ represents the gamma correction factor needed for correct display of output images. The value of gamma depends on display properties and may be equal to 2.4 for standard RGB color space (sRGB) type devices.

FIG. 5 illustrates a plot 500 of one example tone compression function associated with processing by the spatially adaptive tone mapping system, configured in accordance with certain of the embodiments disclosed herein. A family of logarithm based global tone compression curves 502 are shown for converting input pixel values (e.g., from a base plane B) to compressed output pixel values (e.g., for compressed base plane $B_C$). The degree of compression can be varied through selection of values for parameter p, with increasing compression corresponding to smaller values of p.

FIG. 6 illustrates a plot 600 of another example tone compression function associated with processing by the spatially adaptive tone mapping system, configured in accordance with certain of the embodiments disclosed herein. A family of modified logarithm based global tone compression curves 602 are shown for converting input pixel values (e.g., from a base plane B) to compressed output pixel values (e.g., for compressed base plane $B_C$). The degree of compression can be varied through selection of values for parameter p, with increasing compression corresponding to smaller values of p. These modified compression curves limit the output range of the tone compression function to leave headroom 604 and footroom 606 for details in the dark and bright areas of the image to reduce clipping.

Methodology

FIG. 7 is a flowchart illustrating an example method 700 for spatially adaptive tone mapping, in accordance with an embodiment of the present disclosure. As can be seen, example method 700 includes a number of phases and sub-processes, the sequence of which may vary from one embodiment to another. However, when considered in the aggregate, these phases and sub-processes form a spatially adaptive tone mapping process in accordance with certain of the embodiments disclosed herein. These embodiments can be implemented, for example using the system architecture illustrated in FIGS. 1, 3 and 4, as described above. However other system architectures can be used in other embodiments, as will be apparent in light of this disclosure. To this end, the correlation of the various functions shown in FIG. 7 to the specific components illustrated in FIGS. 1, 3 and 4 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. Numerous variations and alternative configurations will be apparent in light of this disclosure.

As illustrated in FIG. 7, in one embodiment spatially adaptive tone mapping method 700 commences by extracting, at operation 710, luminance data associated with pixels from a high dynamic range (HDR) image. The HDR image may be received from a camera or other suitable device capable of generating images with a dynamic range that exceeds the capabilities of typical display devices. Next, at operation 720, the luminance data is converted or transformed into the logarithm domain. In some embodiments, this is accomplished through application of a base 2 logarithm operation.

At operation 730, the logarithm domain luminance data is decomposed or separated out into a base layer, a small scale detail layer, and a large scale detail layer. In some embodiments, the decomposition may be performed by an edge-aware guided filter, employing a unique filter radius parameter for each layer.

At operation 740, the amplitudes of the data in each of the layers are adjusted to shift and scale the amplitudes of the base layer, and to scale the amplitudes of the small scale layer and the large scale layer, into a selected range or mapping that enables the full gamut of data amplitudes to be relatively well represented in the dynamic range that will be available on the display device that is ultimately used to display the image.

At operation 750, the adjusted layers are converted from the log domain back to a linear domain, for example through application of a power of 2 exponentiation operation. At operation 760, a global tone compression function is applied to the converted linear domain base layer to generate compressed linear domain layers. In some embodiments, the global tone compression may be implemented as a gamma compression function, a logarithmic compression function or a rational function compression. At operation 770, compressed luminance data is generated based on a multiplicative product of the compressed linear domain layers.

Of course, in some embodiments, additional operations may be performed, as previously described in connection with the system. These additional operations may include, for example, generating a compressed output image based on scaling of the red-green-blue (RGB) data from the received image by a ratio of the compressed luminance data to the original luminance data from the received image. Additionally, in some embodiments, the output range of the global tone compression function may be limited to reduce clipping.

Example System

Figure 8:
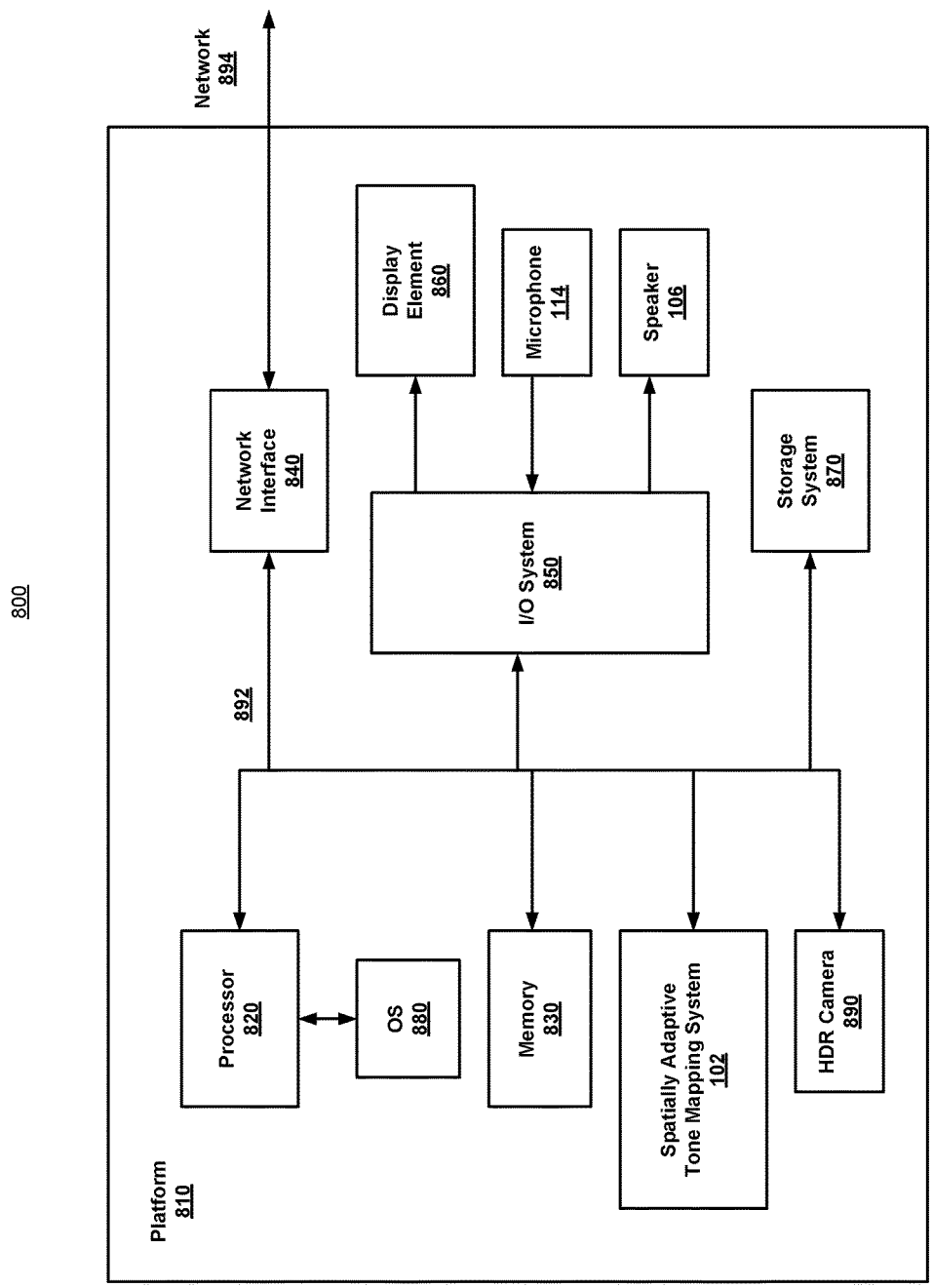
FIG. 8 is a block diagram schematically illustrating a system platform to carry out spatially adaptive tone mapping, configured in accordance with certain of the embodiments disclosed herein.

FIG. 8 illustrates an example system 800 that may carry out spatially adaptive tone mapping, for improved display of HDR images on devices with lower dynamic range capability, as described herein. In some embodiments, system 800 comprises a platform 810 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. Any combination of different devices may be used in certain embodiments.

In some embodiments, platform 810 may comprise any combination of a processor 820, a memory 830, a spatially adaptive tone mapping system 102, an HDR camera 890, a network interface 840, an input/output (I/O) system 850, a display element 860, a microphone 114, a speaker 106 and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 800, and therefore may also be implemented using any suitable existing or subsequently-developed platform.

Network interface module 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, a display element 860, microphone 114, speaker 106, and other devices not shown such as a keyboard, mouse, etc.

I/O system 850 may include a graphics subsystem configured to perform processing of images for display element 860. Graphics subsystem may be a graphics processing unit or a visual processing unit (VPU), for example. An analog or digital interface may be used to communicatively couple graphics subsystem and display element 860. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 820 or any chipset of platform 810. In some embodiments, display element 860 may comprise any television type monitor or display. Display element 860 may comprise, for example, a computer display screen, touchscreen display, video monitor, television-like device, and/or a television. Display element 860 may be digital and/or analog. Under the control of the OS 880 (or one or more software applications), platform 810 may display processed HDR images on display element 860. The HDR images may be provided by HDR camera 890, or other sources, and processed by spatially adaptive tone mapping system 102, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Spatially adaptive tone mapping system 102 is configured to perform dynamic range compression of an HDR image, using techniques that are performed partially in the logarithm domain and partially in the linear domain, to better preserve image details while providing contrast reduction, particularly in the highlight regions of the image. This tone mapping, or range compression, enables HDR images to be displayed on devices that are more limited in providing lower dynamic range capabilities. Spatially adaptive tone mapping system 102 may include any or all of the components illustrated in FIGS. 1, 3 and 4 and described above. Spatially adaptive tone mapping system 102 can be implemented or otherwise used in conjunction with a variety of suitable software and/or hardware that is coupled to or that otherwise forms a part of system 800. Spatially adaptive tone mapping system 102 can additionally or alternatively be implemented or otherwise used in conjunction with user I/O devices that are capable of providing information to, and receiving information and commands from, a user. These I/O devices may include display element 860, a textual input device such as a keyboard, and a pointer-based input device such as a mouse. Other input/output devices that may be used in other embodiments include a touchscreen, a touchpad, a speaker 106, and/or a microphone 114. Still other input/output devices can be used in other embodiments.

In some embodiments spatially adaptive tone mapping system 102 may be installed local to system 800, as shown in the example embodiment of FIG. 8. Alternatively, system 800 can be implemented in a client-server arrangement wherein at least some functionality associated with spatially adaptive tone mapping system 102 is provided to system 800 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the spatially adaptive tone mapping methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, spatially adaptive tone mapping system 102 generates HDR images suitable for display on devices with lower dynamic range capability by leveraging processing resources provided by a remote computer system accessible via network 894. In other embodiments the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for spatially adaptive tone mapping. The method comprises extracting luminance data associated with pixels from a received image. The method further comprises converting the luminance data to a logarithm domain. The method further comprises decomposing the logarithm domain luminance data into a base layer, a small scale detail layer, and a large scale detail layer. The method further comprises adjusting amplitudes of data in each of the layers, the adjusting to shift and scale the amplitudes of the base layer and to scale the amplitudes of the small scale layer and the large scale layer, to map the amplitude data into a selected range. The method further comprises converting the adjusted layers from the logarithm domain to a linear domain. The method further comprises applying a global tone compression function to the converted linear domain base layer to generate compressed linear domain layers. The method further comprises generating compressed luminance data based on a multiplicative product of the compressed linear domain layers.

Example 2 includes the subject matter of Example 1, further comprising limiting the output range of the global tone compression function to reduce clipping.

Example 3 includes the subject matter of Examples 1 and 2, further comprising generating a compressed output image based on scaling of red-green-blue (RGB) data from the received image by a ratio of the compressed luminance data to the luminance data from the received image.

Example 4 includes the subject matter of Examples 1-3, wherein the converting to a logarithm domain further comprises calculating a base 2 logarithm of the luminance data.

Example 5 includes the subject matter of Examples 1-4, wherein the decomposing further comprises applying an edge-aware guided filter to the logarithm domain luminance data, the filter employing a filter radius parameter selected to generate each of the base layer, the small scale detail layer and the large scale detail layer.

Example 6 includes the subject matter of Examples 1-5, wherein the global tone compression function is selected from the group consisting of gamma compression, logarithmic compression and rational function compression.

Example 7 includes the subject matter of Examples 1-6, wherein the small scale detail is an image region comprising a radius in the range of 4 to 5 pixels; and the large scale detail is an image region comprising a radius in the range of 30 to 35 pixels.

Example 8 is a system to perform spatially adaptive tone mapping. The system comprises a log-conversion circuit to convert luminance data, associated with pixels from a received image, from a linear domain to a logarithm domain. The system further comprises an edge-aware filter circuit to decompose the logarithm domain luminance data into a base layer, a small scale detail layer, and a large scale detail layer. The system further comprises an amplitude adjustment circuit to shift and scale the amplitudes of the base layer and to scale the amplitudes of the small scale layer and the large scale layer, to map the amplitude data into a selected range. The system further comprises a linear-conversion circuit to convert the amplitude adjusted layers from the logarithm domain to a linear domain. The system further comprises a global tone compression circuit to apply a global tone compression function to the converted linear domain base layer to generate compressed linear domain layers. The system further comprises a compressed luminance data reconstruction circuit to generate compressed luminance data based on a multiplicative product of the compressed linear domain layers.

Example 9 includes the subject matter of Example 8, wherein the global tone compression circuit is further to limit the output range of the global tone compression function to reduce clipping.

Example 10 includes the subject matter of Examples 8 or 9, further comprising an output generation circuit to generate a compressed output image based on scaling of red-green-blue (RGB) data from the received image by a ratio of the compressed luminance data to the luminance data from the received image.

Example 11 includes the subject matter of Examples 8-10, wherein the log-conversion circuit is further to perform the conversion by calculating a base 2 logarithm of the luminance data.

Example 12 includes the subject matter of Examples 8-11, wherein the edge-aware filter circuit is further to apply an edge-aware guided filter to the logarithm domain luminance data, the filter employing a filter radius parameter selected to generate each of the base layer, the small scale detail layer and the large scale detail layer.

Example 13 includes the subject matter of Examples 8-12, wherein the global tone compression function is selected from the group consisting of gamma compression, logarithmic compression and rational function compression.

Example 14 includes the subject matter of Examples 8-13, wherein the small scale detail is an image region comprising a radius in the range of 4 to 5 pixels; and the large scale detail is an image region comprising a radius in the range of 30 to 35 pixels.

Example 15 is at least one non-transitory computer readable storage medium having instructions encoded thereon that, when executed by one or more processors, result in the following operations for spatially adaptive tone mapping. The operations comprise extracting luminance data associated with pixels from a received image. The operations further comprise converting the luminance data to a logarithm domain. The operations further comprise decomposing the logarithm domain luminance data into a base layer, a small scale detail layer, and a large scale detail layer. The operations further comprise adjusting amplitudes of data in each of the layers, the adjusting to shift and scale the amplitudes of the base layer and to scale the amplitudes of the small scale layer and the large scale layer, to map the amplitude data into a selected range. The operations further comprise converting the adjusted layers from the logarithm domain to a linear domain. The operations further comprise applying a global tone compression function to the converted linear domain base layer to generate compressed linear domain layers. The operations further comprise generating compressed luminance data based on a multiplicative product of the compressed linear domain layers.

Example 16 includes the subject matter of Example 15, further comprising limiting the output range of the global tone compression function to reduce clipping.

Example 17 includes the subject matter of Examples 15 and 16, further comprising generating a compressed output image based on scaling of red-green-blue (RGB) data from the received image by a ratio of the compressed luminance data to the luminance data from the received image.

Example 18 includes the subject matter of Examples 15-17, wherein the converting to a logarithm domain further comprises calculating a base 2 logarithm of the luminance data.

Example 19 includes the subject matter of Examples 15-18, wherein the decomposing further comprises applying an edge-aware guided filter to the logarithm domain luminance data, the filter employing a filter radius parameter selected to generate each of the base layer, the small scale detail layer and the large scale detail layer.

Example 20 includes the subject matter of Examples 15-19, wherein the global tone compression function is selected from the group consisting of gamma compression, logarithmic compression and rational function compression.

Example 21 includes the subject matter of Examples 15-20, wherein the small scale detail is an image region comprising a radius in the range of 4 to 5 pixels; and the large scale detail is an image region comprising a radius in the range of 30 to 35 pixels.

Example 22 is a system for spatially adaptive tone mapping. The system comprises means for extracting luminance data associated with pixels from a received image. The system further comprises means for converting the luminance data to a logarithm domain. The system further comprises means for decomposing the logarithm domain luminance data into a base layer, a small scale detail layer, and a large scale detail layer. The system further comprises means for adjusting amplitudes of data in each of the layers, the adjusting to shift and scale the amplitudes of the base layer and to scale the amplitudes of the small scale layer and the large scale layer, to map the amplitude data into a selected range. The system further comprises means for converting the adjusted layers from the logarithm domain to a linear domain. The system further comprises means for applying a global tone compression function to the converted linear domain base layer to generate compressed linear domain layers. The system further comprises means for generating compressed luminance data based on a multiplicative product of the compressed linear domain layers.

Example 23 includes the subject matter of Example 22, further comprising means for limiting the output range of the global tone compression function to reduce clipping.

Example 24 includes the subject matter of Examples 22 and 23, further comprising means for generating a compressed output image based on scaling of red-green-blue (RGB) data from the received image by a ratio of the compressed luminance data to the luminance data from the received image.

Example 25 includes the subject matter of Examples 22-24, wherein the converting to a logarithm domain further comprises calculating a base 2 logarithm of the luminance data.

Example 26 includes the subject matter of Examples 22-25, wherein the decomposing further comprises applying an edge-aware guided filter to the logarithm domain luminance data, the filter employing a filter radius parameter selected to generate each of the base layer, the small scale detail layer and the large scale detail layer.

Example 27 includes the subject matter of Examples 22-26, wherein the global tone compression function is selected from the group consisting of gamma compression, logarithmic compression and rational function compression.

Example 28 includes the subject matter of Examples 22-27, wherein the small scale detail is an image region comprising a radius in the range of 4 to 5 pixels; and the large scale detail is an image region comprising a radius in the range of 30 to 35 pixels.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for spatially adaptive tone mapping, the method comprising:
    extracting, by a processor, luminance data associated with pixels from a received image;
    converting, by the processor, the luminance data to a logarithm domain;
    decomposing, by the processor, the logarithm domain luminance data into a base layer, a small scale detail layer, and a large scale detail layer;
    adjusting, by the processor, amplitudes of data in each of the layers, the adjusting to shift and scale the amplitudes of the base layer and to scale the amplitudes of the small scale layer and the large scale layer, to map the amplitude data into a selected range;
    converting, by the processor, the adjusted layers from the logarithm domain to a linear domain;
    applying, by the processor, a global tone compression function to the converted linear domain base layer to generate compressed linear domain layers; and
    generating, by the processor, compressed luminance data based on a multiplicative product of the compressed linear domain layers.

2. The method of claim 1, further comprising limiting the output range of the global tone compression function to reduce clipping.

3. The method of claim 1, further comprising generating a compressed output image based on scaling of red-green-blue (RGB) data from the received image by a ratio of the compressed luminance data to the luminance data from the received image.

4. The method of claim 1, wherein the converting to a logarithm domain further comprises calculating a base 2 logarithm of the luminance data.

5. The method of claim 1, wherein the decomposing further comprises applying an edge-aware guided filter to the logarithm domain luminance data, the filter employing a filter radius parameter selected to generate each of the base layer, the small scale detail layer and the large scale detail layer.

6. The method of claim 1, wherein the global tone compression function is selected from the group consisting of gamma compression, logarithmic compression and rational function compression.

7. The method of claim 1, wherein the small scale detail is an image region comprising a radius in the range of 4 to 5 pixels; and the large scale detail is an image region comprising a radius in the range of 30 to 35 pixels.

8. A system to perform spatially adaptive tone mapping, the system comprising:
- a log-conversion circuit to convert luminance data, associated with pixels from a received image, from a linear domain to a logarithm domain;
- an edge-aware filter circuit to decompose the logarithm domain luminance data into a base layer, a small scale detail layer, and a large scale detail layer;
- an amplitude adjustment circuit to shift and scale the amplitudes of the base layer and to scale the amplitudes of the small scale layer and the large scale layer, to map the amplitude data into a selected range;
- a linear-conversion circuit to convert the amplitude adjusted layers from the logarithm domain to a linear domain;
- a global tone compression circuit to apply a global tone compression function to the converted linear domain base layer to generate compressed linear domain layers; and
- a compressed luminance data reconstruction circuit to generate compressed luminance data based on a multiplicative product of the compressed linear domain layers.

9. The system of claim 8, wherein the global tone compression circuit is further to limit the output range of the global tone compression function to reduce clipping.

10. The system of claim 8, further comprising an output generation circuit to generate a compressed output image based on scaling of red-green-blue (RGB) data from the received image by a ratio of the compressed luminance data to the luminance data from the received image.

11. The system of claim 8, wherein the log-conversion circuit is further to perform the conversion by calculating a base 2 logarithm of the luminance data.

12. The system of claim 8, wherein the edge-aware filter circuit is further to apply an edge-aware guided filter to the logarithm domain luminance data, the filter employing a filter radius parameter selected to generate each of the base layer, the small scale detail layer and the large scale detail layer.

13. The system of claim 8, wherein the global tone compression function is selected from the group consisting of gamma compression, logarithmic compression and rational function compression.

14. The system of claim 8, wherein the small scale detail is an image region comprising a radius in the range of 4 to 5 pixels; and the large scale detail is an image region comprising a radius in the range of 30 to 35 pixels.

15. At least one non-transitory computer readable storage medium having instructions encoded thereon that, when executed by one or more processors, result in the following operations for spatially adaptive tone mapping, the operations comprising:
- extracting luminance data associated with pixels from a received image;
- converting the luminance data to a logarithm domain;
- decomposing the logarithm domain luminance data into a base layer, a small scale detail layer, and a large scale detail layer;
- adjusting amplitudes of data in each of the layers, the adjusting to shift and scale the amplitudes of the base layer and to scale the amplitudes of the small scale layer and the large scale layer, to map the amplitude data into a selected range;
- converting the adjusted layers from the logarithm domain to a linear domain;
- applying a global tone compression function to the converted linear domain base layer to generate compressed linear domain layers; and
- generating compressed luminance data based on a multiplicative product of the compressed linear domain layers.

16. The computer readable storage medium of claim 15, further comprising limiting the output range of the global tone compression function to reduce clipping.

17. The computer readable storage medium of claim 15, further comprising generating a compressed output image based on scaling of red-green-blue (RGB) data from the received image by a ratio of the compressed luminance data to the luminance data from the received image.

18. The computer readable storage medium of claim 15, wherein the converting to a logarithm domain further comprises calculating a base 2 logarithm of the luminance data.

19. The computer readable storage medium of claim 15, wherein the decomposing further comprises applying an edge-aware guided filter to the logarithm domain luminance data, the filter employing a filter radius parameter selected to generate each of the base layer, the small scale detail layer and the large scale detail layer.

20. The computer readable storage medium of claim 15, wherein the global tone compression function is selected from the group consisting of gamma compression, logarithmic compression and rational function compression.

21. The computer readable storage medium of claim 15, wherein the small scale detail is an image region comprising a radius in the range of 4 to 5 pixels; and the large scale detail is an image region comprising a radius in the range of 30 to 35 pixels.

\* \* \* \* \*